(12) United States Patent
Lee et al.

(10) Patent No.: US 9,775,184 B2
(45) Date of Patent: Sep. 26, 2017

(54) PAIRING TERMINALS WITH A SOUND WAVE SIGNAL

(71) Applicant: Samsung Electronics Co., Ltd., Gyeonggi-do (KR)

(72) Inventors: Jinwoo Lee, Seoul (KR); Jiyeon Seo, Seoul (KR); Myunghwan Lee, Seoul (KR); Yongcheol Cha, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/509,160

(22) Filed: Oct. 8, 2014

(65) Prior Publication Data

US 2015/0099470 A1    Apr. 9, 2015

(30) Foreign Application Priority Data

Oct. 8, 2013    (KR) .................. 10-2013-0119573

(51) Int. Cl.
*H04W 76/02* (2009.01)
*H04W 4/00* (2009.01)
*H04W 8/00* (2009.01)

(52) U.S. Cl.
CPC ......... *H04W 76/023* (2013.01); *H04W 4/008* (2013.01); *H04W 8/005* (2013.01)

(58) Field of Classification Search
CPC ... H04W 4/008; H04W 76/02; H04W 76/023; H04W 8/005
See application file for complete search history.

(56) References Cited

U.S. PATENT DOCUMENTS

| | | | |
|---|---|---|---|
| 2007/0116293 A1 | 5/2007 | Busser et al. | |
| 2010/0110837 A1 | 5/2010 | Jung et al. | |
| 2010/0281261 A1 | 11/2010 | Razzell | |
| 2012/0128154 A1 | 5/2012 | Ran | |
| 2012/0214416 A1 | 8/2012 | Kent et al. | |
| 2014/0256260 A1* | 9/2014 | Ueda ................... | H04W 76/023 455/41.2 |

FOREIGN PATENT DOCUMENTS

| | | |
|---|---|---|
| KR | 10-2010-0130061 A | 12/2010 |
| WO | 2009/066212 A1 | 5/2009 |
| WO | 2010/050700 A2 | 5/2010 |

* cited by examiner

*Primary Examiner* — Lewis West
(74) *Attorney, Agent, or Firm* — Cha & Reiter, LLC

(57) ABSTRACT

Disclosed herein are a method and apparatus for pairing terminals using a sound wave. A sound wave is transmitted from a first terminal to a second terminal and a response is sent by the second terminal and detected by the first terminal. The first terminal and the second terminal are paired based at least partially on the sound wave signal and the response signal.

4 Claims, 10 Drawing Sheets

PAIRING TERMINALS WITH A SOUND WAVE SIGNAL

CROSS-REFERENCE TO RELATED APPLICATION

This application claims priority from and the benefit under 35 U.S.C. §119(a) of Korean Patent Application No. 10-2013-0119573, filed on Oct. 8, 2013, which is hereby incorporated by reference herein.

TECHNICAL FIELD

The present disclosure relates generally to a method and apparatus that that enables terminals to interact with each other.

BACKGROUND

Early mobile terminals provided basic services, such as phone and texting services. However, current mobile terminals provide many more services, such as printing photos and documents wirelessly. In order to provide such services, a mobile terminal and a device for printing the photos need to be paired with each other. Accordingly, a mobile terminal may be connected with some other device through Bluetooth or some other short range wireless connection.

For example, a Bluetooth connection between a mobile terminal and some other device may be achieved by activating Bluetooth functions of both the mobile terminal and the other device, positioning the mobile terminal within a specific distance of the other device so as to allow the other device and the mobile terminal to scan and recognize each other.

SUMMARY

The present disclosure provides a method and an apparatus of interaction between terminals using a sound wave, by which the terminals may be easily paired.

An embodiment of the present invention provides a method and an apparatus of interaction between terminals using a sound wave, by which a sound wave signal including terminal identification information that includes a terminal profile and a terminal identifier is transmitted, and if the terminal identifier is included in a response signal that is transmitted in response to the sound wave signal, the terminals may be automatically paired without an additional identification process.

An embodiment of the present invention provides a method and an apparatus of interaction between terminals using a sound wave, by which if terminals are positioned within a specific distance from each other, one of the terminals may transmit a sound wave signal to thereby verify whether there is a terminal able to be paired, and then the terminal may transmit a sound wave signal for pairing.

An embodiment of the present invention provides a method and an apparatus of interaction between terminals using a sound wave, by which a sound wave signal is transmitted when predetermined sensor information is detected by a gyro-sensor or predetermined positional information is detected by a GPS module. Therefore, a sound wave signal may be automatically transmitted by using various sensors.

An embodiment of the present invention provides a method and an apparatus of interaction between terminals using a sound wave, by which, when the second terminal is detected to be within a reference distance by a proximity sensor of the first terminal, a sound wave signal may be transmitted, and the second terminal may execute a paring application in response to the transmitted sound wave signal so that the first terminal and the second terminal are effectively paired with each other.

An embodiment of the present invention provides a method and an apparatus of interaction between terminals using a sound wave, by which the first terminal may transmit a sound wave signal including a desired communication method so that the first terminal and the second terminal may communicate with each other by the desired communication method after the first terminal is paired with the second terminal that has transmitted a response signal corresponding to the sound wave signal.

An embodiment of the present invention provides a method and an apparatus of interaction between terminals using a sound wave, in which the sound wave signal to be transmitted may be an ultrasonic signal or a predetermined audio frequency signal so that terminals may be effectively paired with each other through the sound wave signal without stimulation of a user's hearing.

Disclosed herein are a method and apparatus of interaction between terminals using a sound wave. In one aspect, the apparatus and the method thereof may: transmit a sound wave signal to a second terminal through an output device of a first terminal; detect a response signal from the second terminal; and pair the first terminal with the second terminal based at least partially on the sound wave signal and the response signal. The sound wave signal may comprise a terminal profile and a terminal identifier associated with the first terminal. In another aspect, the first terminal may pair with the second terminal, when the terminal identifier included in the sound wave signal sent by the first terminal is identical to the terminal identifier included in the response signal sent by the second terminal.

In one example, an apparatus and method thereof may pair with the second terminal when the second terminal is located within a specific distance from the first terminal such that the sound wave is able to reach the second terminal. The sound wave signal may comprise an ultrasonic signal or a predetermined audio frequency signal. In another aspect, the first terminal may transmit the sound wave signal, when a predetermined gesture is detected by a gyro-sensor. In yet a further aspect, the first terminal may transmit the sound wave signal, when a predetermined geographical positional is detected by a GPS module. In another example, the first terminal may transmit the sound wave signal, when the second terminal is identified to be within a reference distance of the first terminal by a proximity sensor of the first terminal.

In another aspect, a method of the present disclosure may include: pairing a first terminal with a second terminal using a sound wave signal; configuring a communication method between the first terminal and the second terminal; and communicating between the first terminal and the second terminal through the configured communication method. The communication method may be indicated in the sound wave signal or the response signal.

In a further aspect, a method may further include: when the second terminal is detected within a reference distance from the first terminal, transmitting the sound wave signal by the first terminal to the second terminal so as to enable the second terminal to execute a pairing application; and detecting, by the first terminal, a response signal from the second terminal generated with the pairing application.

In a yet another aspect, a method of the present disclosure may include: when a predetermined gesture is detected with a gyro-sensor, verifying whether the second terminal is located within the reference distance by a proximity sensor; when the second terminal is located within the reference distance, verifying a geographic position of the first terminal using a GPS module; and when the geographic position is a predetermined geographic position, transmitting the sound wave signal.

In another example, an apparatus may include at least one processor to transmit a sound wave signal to a remote terminal through a signal output unit; detect a response signal from the remote terminal; and pair with the remote terminal based at least partially on the sound wave signal and the response signal.

BRIEF DESCRIPTION OF THE DRAWINGS

The above features and advantages of the present disclosure will be more apparent from the following detailed description in conjunction with the accompanying drawings, in which.

DETAILED DESCRIPTION

Figure 1:
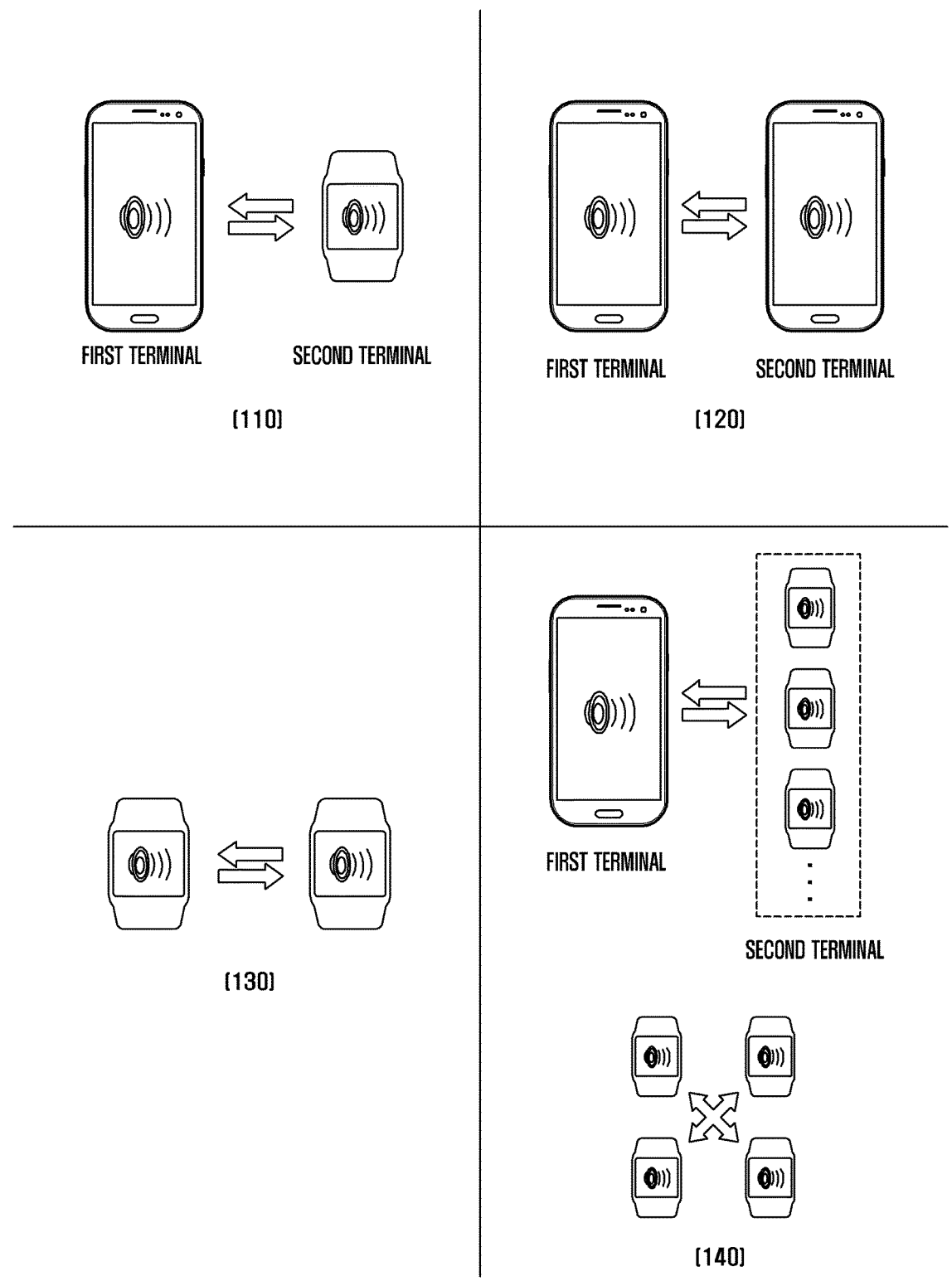
FIG. 1 illustrates a working example of pairing terminals in accordance with aspects of the present disclosure.

Hereinafter, various examples will be described in detail with reference to the accompanying drawings. It should be noted that the same elements will be designated by the same reference numerals although they are shown in different drawings. Furthermore, details of known functions and configurations will be omitted when it would obscure the subject matter of the present disclosure.

Referring to the example of FIG. 1, different types of terminals, such as the first terminal and the second terminal shown in diagram 110, may be paired with a sound wave. In the example of FIG. 1, the first terminal may be a mobile device with telecommunication capabilities, and the second terminal may be another type of device including, but not limited to, a wearable device.

Alternatively, diagrams 120 and 130 are examples illustrating the pairing of terminals of the same type. These terminals are also shown being paired with a sound wave. Diagram 140 illustrates an example of using a sound wave to pair a first terminal of a first type with a plurality of other devices of a different type. Diagram 140 also shows a plurality of terminals of the same type being paired with each other using a sound wave.

In one example, different types of terminals may be paired with each other in a one to one pairing, and terminals of the same type may also be paired with each other in a one to one pairing. Furthermore, different types of terminals may be paired with each other in a one to N pairing, or the same type of terminals may be paired with each other in a N to N pairing.

Figure 2:
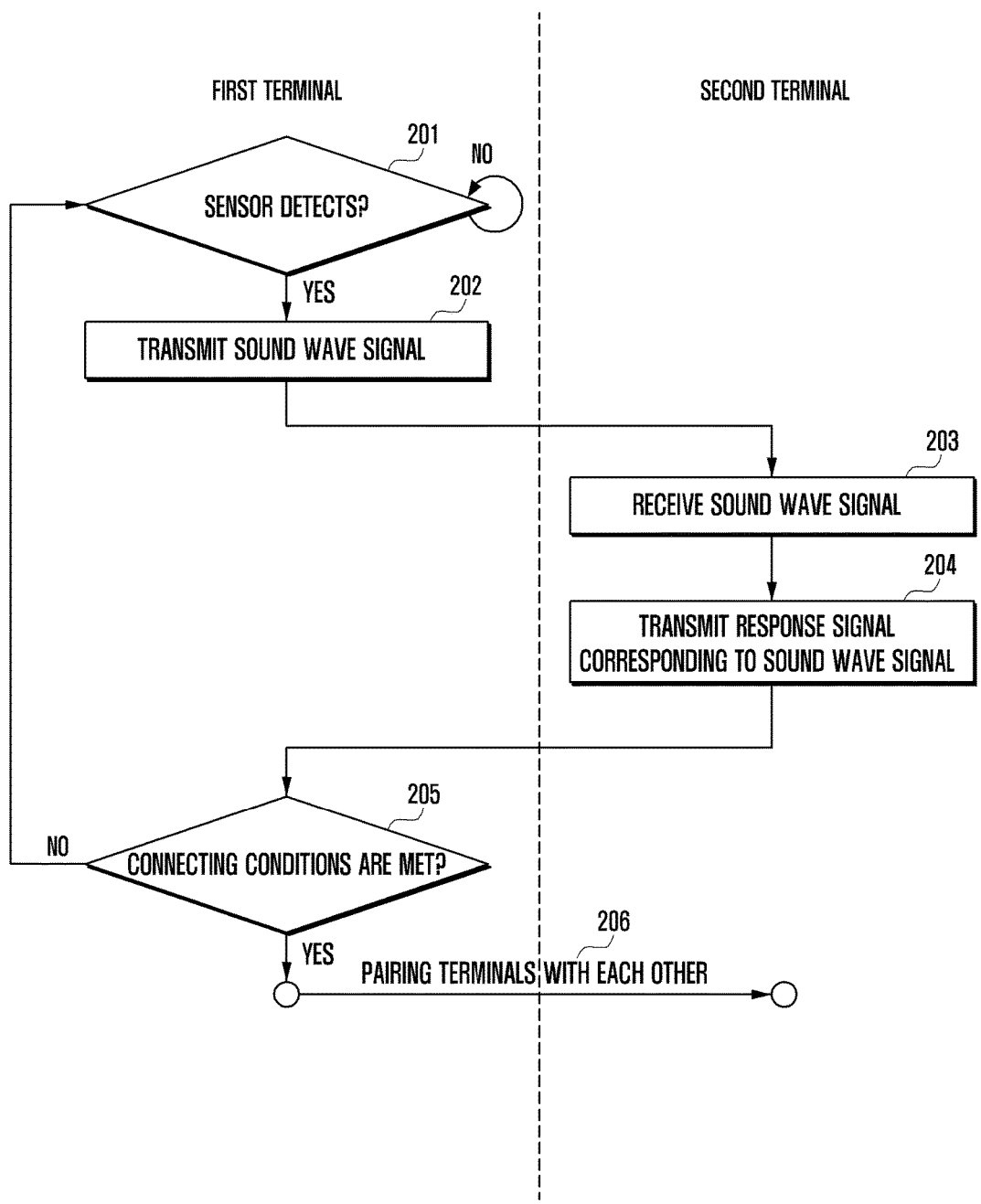
FIG. 2 is a flowchart illustrating an example method of interaction between terminals in accordance with aspects of the present disclosure.

Referring now to the example method of FIG. 2, in operation 201, a first terminal may check whether a predetermined sensor value is detected by sensors. Here, the sensor may be at least one of a gyro-sensor, a GPS module, or a proximity sensor. The process of detecting sensor values by the first terminal will be described in more detail with reference to FIGS. 3 to 5.

In operation 202, the first terminal transmits a sound wave signal through an output device to the second terminal when the predetermined sensor value is detected.

In one example, when a predetermined gesture is detected by the gyro-sensor, the first terminal may transmit the sound wave signal in operation 202. Alternatively, when predetermined positional information is detected by the GPS module, the first terminal may transmit the sound wave signal in operation 202. That is, the first terminal may send the sound wave signal when the first terminal is at a predetermined position. Alternatively, when the second terminal is identified to be within a reference distance by a proximity sensor of the first terminal, the first terminal may transmit the sound wave signal in operation 202.

In another example, the transmitted sound wave signal may include terminal identification information. The terminal identification information may comprise a terminal profile and a terminal identifier associated with the first terminal. The terminal profile may include the first terminal's name, type, or the like, and the terminal identifier may be an unique key value associated with the first terminal. In a further example, the sound wave signal may be an ultrasonic wave signal or a predetermined audio frequency signal.

In operation 203, the second terminal may receive the transmitted sound wave signal. The second terminal may be located within a specific distance from the first terminal such that the sound wave is able to reach the second terminal.

In operation 204, the second terminal may transmit a response signal to the first terminal that corresponds to the sound wave signal. The second terminal may insert the terminal identifier included in the sound wave signal in the response signal and transmit the same.

In operation 205, the first terminal may receive the response signal and determine whether the response signal meets certain conditions. For example, when the terminal identifier included in the sound wave signal is identical to the terminal identifier included in the response signal, the first terminal may deem the response signal to be compliant with the condition.

In operation 206, if the conditions are met, the first terminal and the second terminal may be paired. The pairing process of the first terminal and the second terminal may be a pre-processing stage for information exchange or may be a mutual communication between the first terminal and the second terminal.

Figure 3:
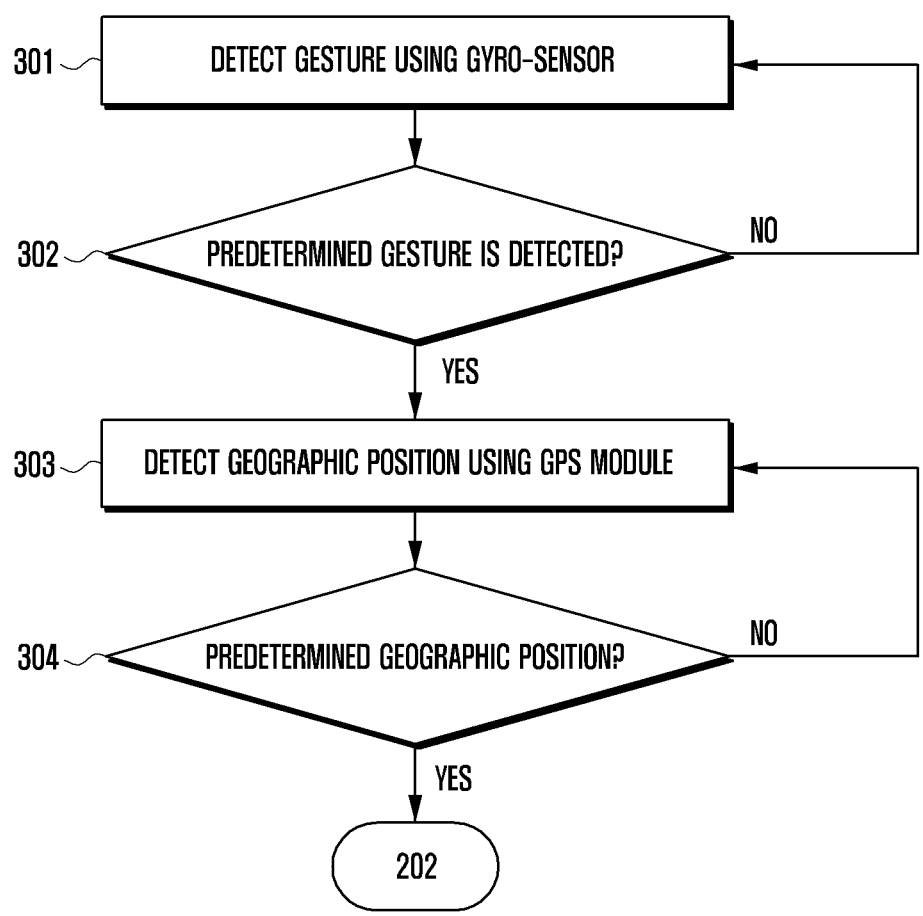
FIG. 3, FIG. 4 and FIG. 5 are flowcharts of different example methods of transmitting a sound wave signal in accordance with aspects of the present disclosure.

Referring now to the example method of FIG. 3, the gyro-sensor of the first terminal may detect a gesture in operation 301. The gyro-sensor may sense gyroscopic inertia, so it can detect a rotational angle value of the gesture through the first terminal. For example, the gyro-sensor of the first terminal may detect whether the first terminal is in a vertical position or a horizontal position. Thus, when the first terminal is detected to be in the vertical position, the first terminal may display images longitudinally on the screen, otherwise when the first terminal is detected to be in the horizontal position, the first terminal may display images horizontally on the screen.

The first terminal may store a predetermined gesture that, when detected, triggers the transmission of the sound wave signal. For example, the gestures that may include, but are not limited to, shaking hands or waving hands for greeting.

In operation 302, the first terminal may verify whether the detected gesture is the predetermined gesture. As a result of the verification, when the predetermined gesture is detected, the first terminal may detect a geographic position of the device using a GPS module in operation 303. The geographic position may be determined in relation to the detected gesture. In operation 304, when the detected geographic position is a predetermined geographic position, the first terminal may transmit the sound wave signal as described in operation 202.

Figure 4:
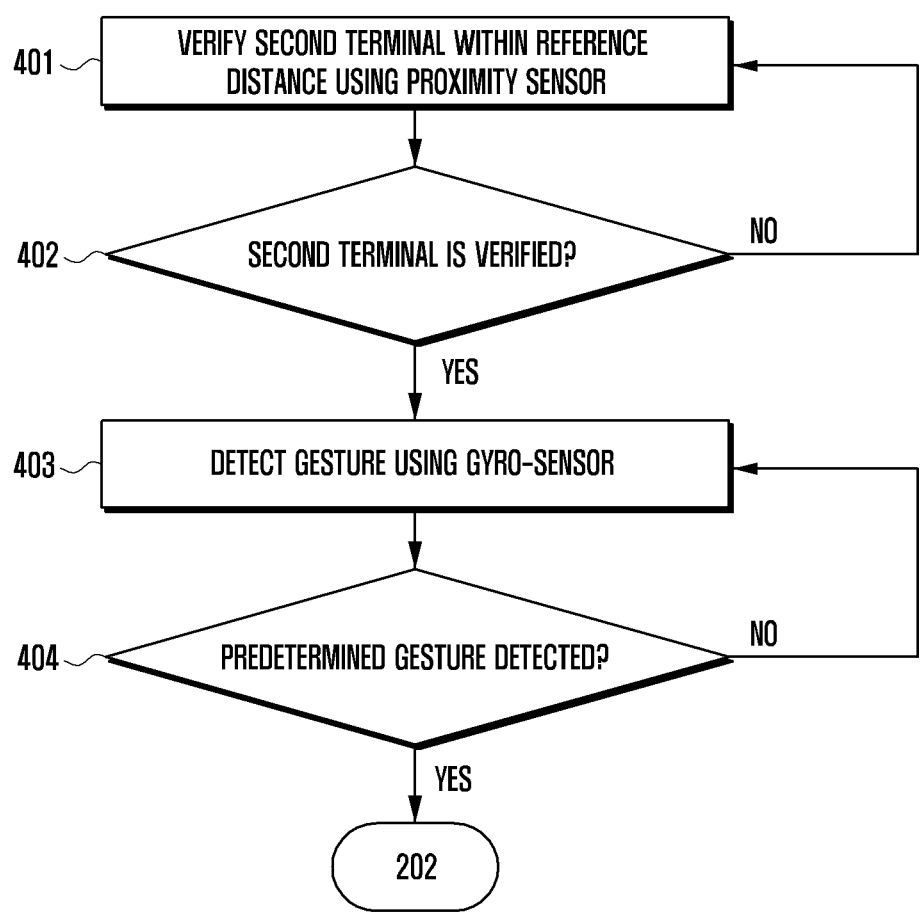

Referring to the other example method in FIG. 4, in operation 401, the first terminal may verify whether the second terminal is located within a reference distance by using a proximity sensor. The proximity sensor may detect objects within a specific distance from the first terminal. When the second terminal is detected to be located within a specific distance in operation 402, the first terminal may detect a gesture by using gyro-sensor in operation 403. In operation 404, when the detected gesture is a predetermined gesture, the first terminal may transmit the sound wave signal as described in operation 202.

Figure 5:
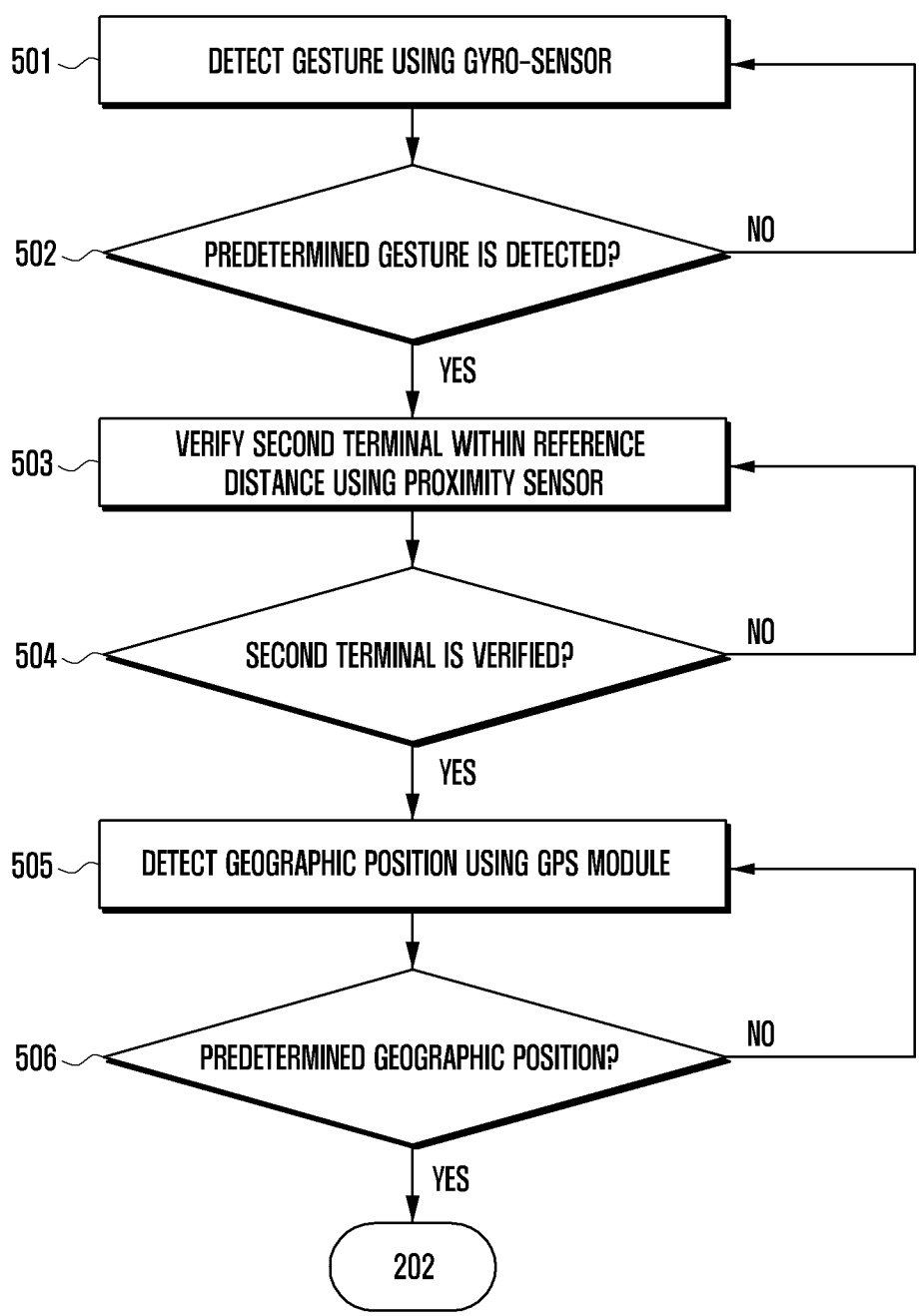

Referring to yet another example method in FIG. 5, the first terminal may detect a gesture by using the gyro-sensor in operation 501. In operation 502, the first terminal may determine whether the detected gesture is the predetermined gesture. In operation 503, when the detected gesture is the predetermined gesture, the first terminal may verify whether the second terminal is located within a reference distance by using the proximity sensor. When the first terminal is verified to be located within the reference distance in operation 504, the first terminal may detect a geographic position of the first terminal by using a GPS module in operation 505. When the detected geographic position is a predetermined geographic position in operation 506, the first terminal may transmit the sound wave signal as described in operation 202.

Figure 6:
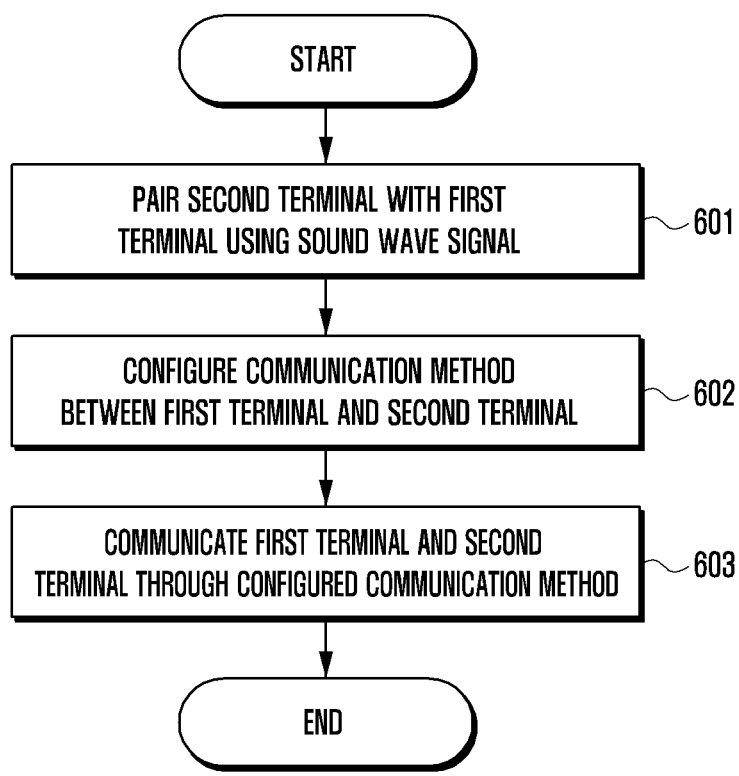
FIG. 6 is a flowchart illustrating an example method of interaction between terminals in accordance with aspects of the present disclosure.

Referring now to another example method shown in FIG. 6, the first terminal and the second terminal may be paired using a sound wave signal in operation 601. In one example, the first terminal may transmit a sound wave signal when the second terminal is located within a reference distance. In a further example, the sound wave signal may enable the second terminal to execute a pairing application. In turn, the pairing application may generate and transmit a response signal to the first terminal that allows the first terminal and the second terminal to be paired. An example of transmitting the response signal will be described in more detail with reference to FIG. 7.

In operation 602, the first terminal and the second terminal may configure a communication method. In configuring the communication method during the pairing, the first terminal may indicate a desired communication method in the sound wave signal, or the second terminal may indicate a desired communication method in the response signal. The communication method may include, but is not limited to, Bluetooth, Near Field Communication (NFC) and Wi-Fi.

In operation 603, the first terminal and the second terminal may communicate with each other through the configured communication method. The communication may be made for exchanging information or providing other services.

Figure 7:
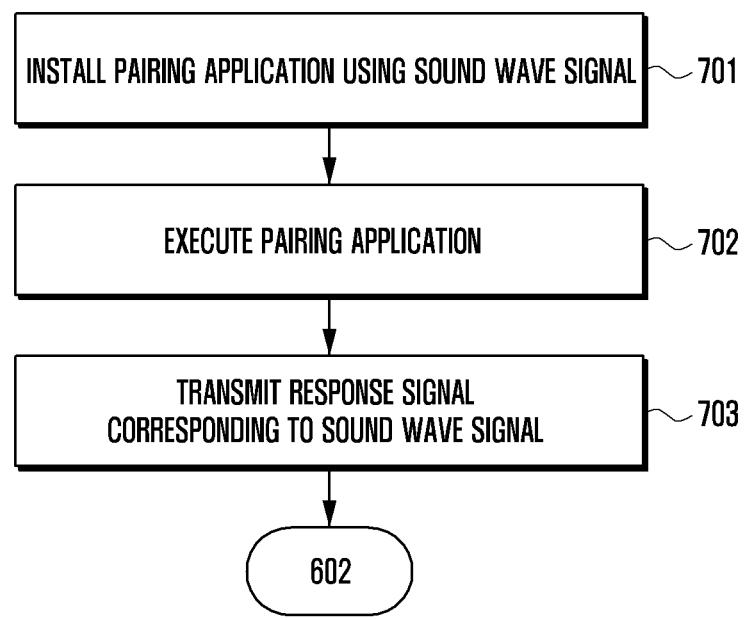
FIG. 7 illustrates a working example of transmitting a response signal in accordance with aspects of the present disclosure.

Referring now to the example method of FIG. 7, in operation 701, the second terminal may receive the sound wave signal from the first terminal that is located within a reference distance and, in response to detecting the sound wave signal, the second terminal may install a pairing application. In one example, when a predetermined gesture is detected by a gyro-sensor, the first terminal may check whether the second terminal is located within a reference distance. If the second terminal is located within the reference distance, the first terminal may identify a geographical position of the first terminal with a GPS module and, if the identified geographical position of the first terminal is a predetermined geographical position, the first terminal may transmit the sound wave signal.

The sound wave signal may include a terminal profile and a terminal identifier. In addition, the sound wave signal may include an address of a webpage from which the pairing application may be installed. If the second terminal does not have the pairing application installed therein, the second terminal may install the pairing application using the address of the webpage included in the sound wave.

In operation 702, the second terminal may execute the pairing application in response to the sound wave signal. That is, the pairing application may be automatically executed upon receipt of the sound wave signal. In operation 703, the second terminal may transmit a response signal to the first terminal using the pairing application. The response signal may include the terminal identifier that was included in the sound wave signal. In addition, the response signal may indicate the communication method desired by the second terminal.

If the terminal identifier included in the sound wave signal is identical to the terminal identifier included in the response signal, the first terminal may be automatically paired with the second terminal. Alternatively, the first terminal may be selectively paired with the second terminal by the user.

Figure 8:
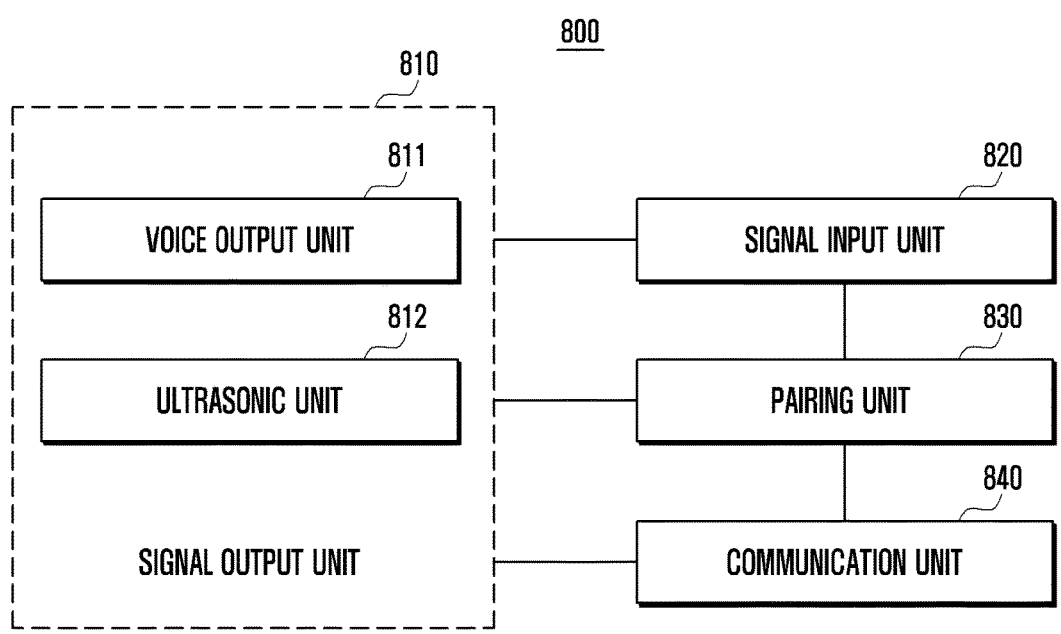
FIG. 8 is a block diagram illustrating an example configuration of an apparatus in accordance with aspects of the present disclosure.

Referring now to the example apparatus of FIG. 8, an example apparatus 800 for executing the techniques disclosed herein may include a signal output unit 810, a signal input unit 820, a pairing unit 830, and a communication unit 840. The apparatus 800 may be the first terminal or the second terminal.

The signal output unit 810 may transmit a sound wave signal. The signal output unit 810 may include a voice output unit 811 or an ultrasonic unit 812. The voice output unit 811 may output a predetermined audio frequency signal for the sound wave signal through an output device such as a speaker. The ultrasonic unit 812 may output an ultrasonic signal as the sound wave signal.

The signal output unit 810 may transmit the sound wave signal that includes terminal identification information associated with the terminal. The terminal identification information may include a terminal profile and a terminal identifier. The terminal profile may include, but is not limited to, the terminal's name, type, or the like, and the terminal identifier may be a unique key value associated with the terminal.

Although not shown in the drawings, apparatus 800 may include at least one of a proximity sensor, a gyro-sensor, or a GPS module. For example, when a terminal is detected to be within a reference distance by the proximity sensor, the signal output unit 810 may detect the gesture using the gyro-sensor, and if the detected gesture is a predetermined gesture, the signal output unit 810 may transmit the sound wave signal. In addition, apparatus 800 may include at least one processor to execute the units therein. Each processor may be any type of processor including, but not limited to, processors from Intel® Corporation. In another example, each processor may be an application specific integrated circuit ("ASIC").

The signal input unit 820 receives a sound wave signal transmitted by a remote device. The signal input unit 820 may receive the transmitted sound wave signal through an input device such as a microphone. The signal input unit 820 may receive the sound wave signal in real time. The signal output unit 810 may transmit a response signal corresponding to the sound wave signal. If the terminal identification information included in the sound wave signal is identical to the terminal identification information included in the response signal, the pairing unit 830 may pair terminals.

The communication unit 840 communicates with another communication unit through a predetermined communication method between the paired terminals. The communication method may be indicated in the sound wave signal and transmitted by the terminal that transmits the sound wave signal, otherwise the communication method may be indicated in the response signal and transmitted by the terminal that transmits the response signal. The communication method may include, but is not limited to, Bluetooth, short range wireless communication, or wireless communication.

Figure 9:
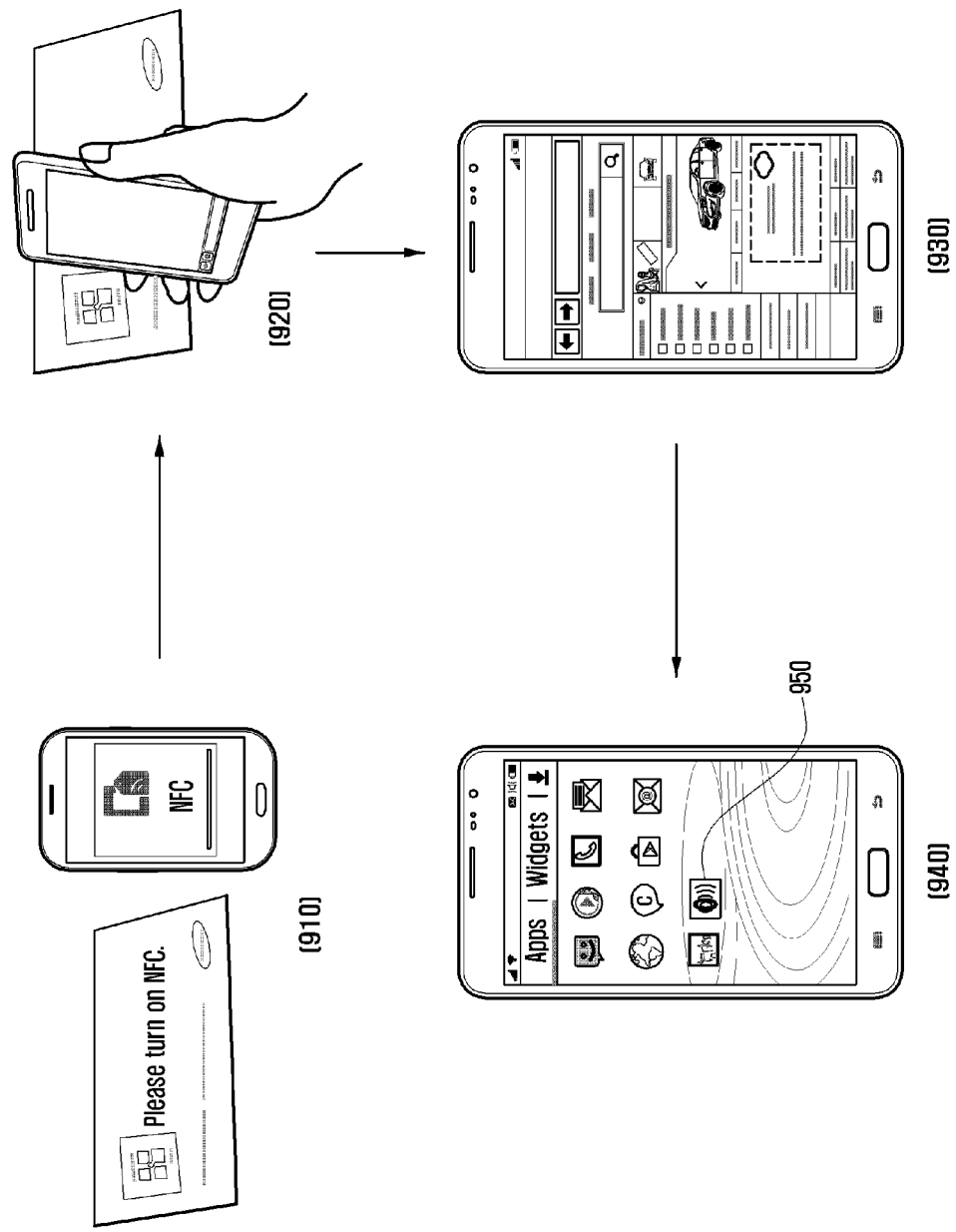
FIG. 9 illustrates a working example of installing a pairing application in accordance with aspects of the present disclosure.

Referring now to the working example of FIG. 9, in operation 910, when initial power is applied, the first terminal may make a request to the second terminal that is to be paired with the first terminal for short range wireless communication. In operation 920, the second terminal may make a tag with respect to a predetermined position according to the request of the first terminal by user of the second terminal. When the second terminal is tagged at the predetermined position by the user, in operation 930, the second terminal may access an installation page for a pairing application that enables the second terminal to be paired with the first terminal using the sound wave signal.

In operation 940, the second terminal may install the pairing application 950 and the first terminal may be paired with the second terminal.

Figure 10:
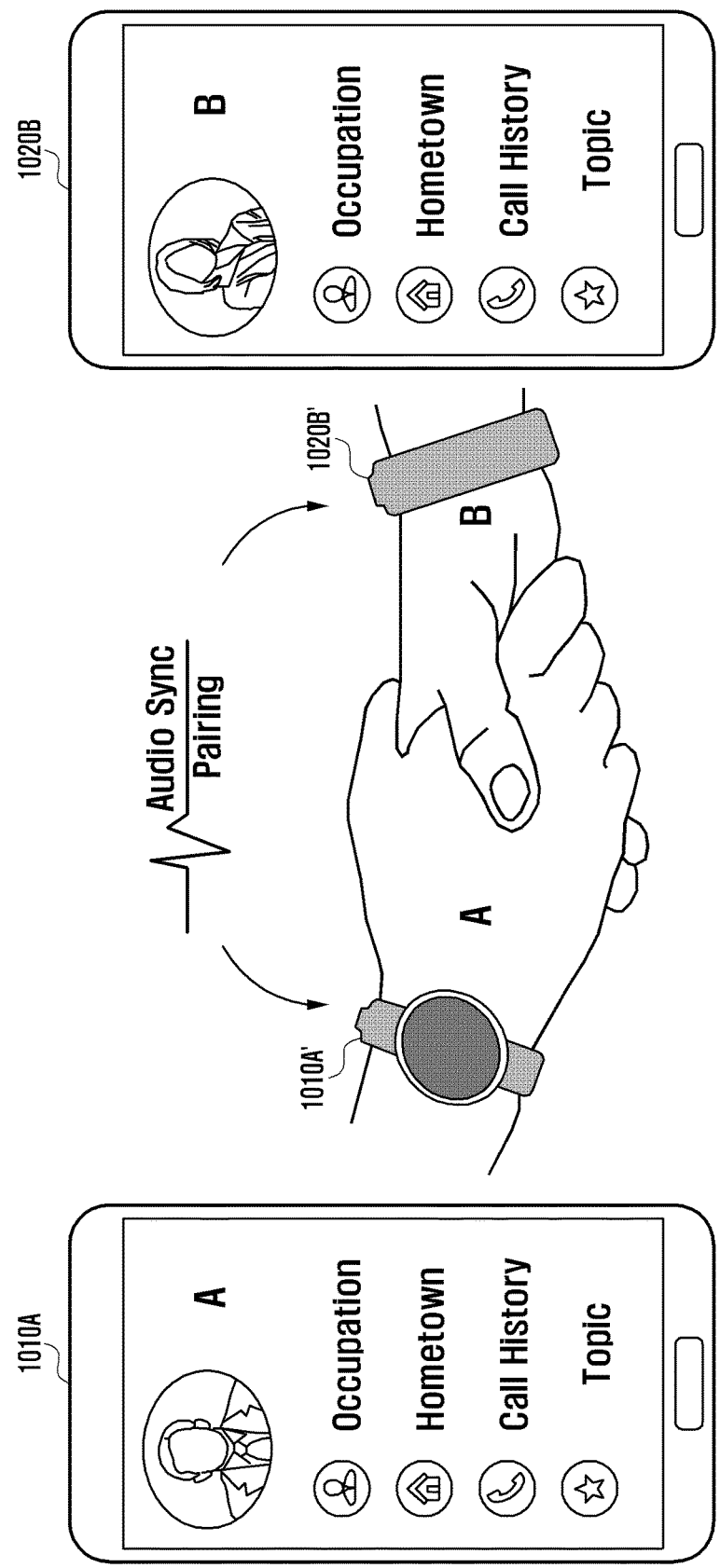
FIG. 10 illustrates a working example of paring terminals in accordance with aspects of the present disclosure.

Referring now to the working example of FIG. 10, the first terminal 1010A and the second terminal 1010A' are paired, and the third terminal 1020B and the fourth terminal 1020B' are also paired. The second terminal 1010A' and the fourth terminal 1020B' may check whether a predetermined gesture is detected by using sensors. The predetermined gesture may include, but is not limited to, shaking hands or waving hands. In this instance, when a predetermined gesture is detected the second terminal 1010A' or the fourth terminal 1020B' may transmit a sound wave signal. The gesture may be detected by a gyro-sensor, a GPS module, and/or a proximity sensor.

The second terminal 1010A' may insert a terminal profile and a terminal identifier associated with the second terminal in the sound wave signal and transmit the same. Alternatively, the fourth terminal 1020B' may insert a terminal profile and a terminal identifier associated with the fourth terminal in the sound wave signal and transmit the same.

The working example of FIG. 10 assumes that the second terminal 1010A' transmits the sound wave signal. The fourth terminal 1020B' may receive the sound wave signal and transmit the response signal corresponding to the sound wave signal. The response signal may include a terminal identifier associated with the second terminal 1010A'. The second terminal 1010A' may receive the response signal, and if the received response signal includes the terminal identifier transmitted through the sound wave signal, the second terminal 1010A' may be paired with the fourth terminal 1020B'.

In one example, the sound wave signal or the response signal may indicate the desired communication method. Alternatively, the desired communication method may be configured after pairing, and the second terminal 1010A' and the fourth terminal 1020B' may communicate with each other through the configured communication method.

As is apparent from the foregoing, the present invention has an advantage over the conventional method. Typically, a Bluetooth connection must activate Bluetooth functions of both the mobile terminal and scan option to recognize each other. However, according to the teachings of the present invention, a terminal can merely transmit a sound save without activating the Bluetooth functions as required in the past.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory computer readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The functions and process steps herein may be performed automatically or wholly or partially in response to user command. An activity (including a step) performed automatically is performed in response to executable instruction or device operation without user direct initiation of the activity. The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

What is claimed is:

1. A method of interaction between terminals using a sound wave, the method comprising:
   when initial power is applied, make a request from a first terminal to a second terminal;
   responsive to said request, making a tag with respect to a predetermined position by the second terminal;
   pairing a first terminal with a second terminal using a sound wave signal, wherein the sound wave signal includes an address of a web page and identifies a desired one of a plurality of communication methods, wherein pairing further comprises:
   installing a pairing application on the second terminal from an installation page responsive to making the tag; and
   transmitting a response signal by the second terminal using the pairing application;
   communicating between the first terminal and the second terminal with the desired one of the plurality of communication methods identified in the sound wave signal,
   wherein the first terminal detects whether a terminal identifier transmitted in the sound wave signal is a terminal identifier transmitted in the response signal.

2. The method of claim 1, wherein pairing the first terminal with the second terminal further comprises:
   when the second terminal is detected within a reference distance from the first terminal, transmitting the sound wave signal by the first terminal to the second terminal causing the second terminal to execute the pairing application; and
   detecting, by the first terminal, the response signal from the second terminal generated with the pairing application.

3. The method of claim 2, wherein transmitting the sound wave signal comprises:
   when a predetermined gesture is detected with a gyro-sensor, verifying whether the second terminal is located within the reference distance by a proximity sensor;
   when the second terminal is located within the reference distance, verifying a geographic position of the first terminal using a GPS module; and
   when the geographic position is a predetermined geographic position, transmitting the sound wave signal.

4. The method of claim 2, wherein the first terminal pairs with the second terminal, when a terminal identifier included in the sound wave signal sent by the first terminal is identical to the terminal identifier included in the response signal sent by the second terminal.

* * * * *